United States Patent
Sun

(10) Patent No.: US 7,335,028 B2
(45) Date of Patent: Feb. 26, 2008

(54) SYSTEM AND METHOD FOR CREATING AN INDIVIDUALIZED EXAM PRACTICE QUESTION SET

(76) Inventor: Charles Sun, 14 Foss Ct., Walnut Creek, CA (US) 94597

( * ) Notice: Subject to any disclaimer, the term of this patent is extended or adjusted under 35 U.S.C. 154(b) by 610 days.

(21) Appl. No.: 11/008,046

(22) Filed: Dec. 8, 2004

(65) Prior Publication Data

US 2006/0121432 A1 Jun. 8, 2006

(51) Int. Cl.
*G09B 3/00* (2006.01)
(52) U.S. Cl. ........................... 434/322; 434/350
(58) Field of Classification Search ............... 434/322, 434/350
See application file for complete search history.

(56) References Cited

U.S. PATENT DOCUMENTS 5,820,386 A * 10/1998 Sheppard, II ............... 434/322
6,988,096 B2 * 1/2006 Gupta et al. ................. 707/3

* cited by examiner

*Primary Examiner*—Robert E. Pezzuto
*Assistant Examiner*—Cameron Saadat

(57) ABSTRACT

A computer-implemented system and method are provided for selecting practice exam questions that reflects the focus of actual exam, a student's preferences, and the student's past performance in particular topics. The system and method are particularly useful for assisting students preparing for an exam, but may be used in general for computerized education. Actual exam information, a student's past performance data and preferences are represented as data tables inside the computer memory. Such past performance data may include an accuracy ratio and the average time spent per question for each topic. A formula is applied to evaluate these data to obtain a numeric measure of the importance of each preferred exam practice topic. The number of practice questions to select per topic is determined based on the numeric measure. Questions from a set of practice questions are selected randomly or deterministically for each topic.

4 Claims, 4 Drawing Sheets

SYSTEM AND METHOD FOR CREATING AN INDIVIDUALIZED EXAM PRACTICE QUESTION SET

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to computerized search methods for automatically selecting useful information content for a particular user. More specifically, the invention relates to computerized search methods for selecting relevant exam practice questions that reflects the focus of actual exam, a student's preferences, and the student's past performance in particular exam topics.

With the increasing availability of personal computers to students, computerized exam preparation software has become commonplace. For example, ExamWeb.Com online software provides a student with practice exams and instant feedback on performance. Such preparation software often use practice exams as an integral part of exam preparation. The creation of a practice exam involves the selection of questions from a set of practice questions. A properly selected practice exam can significantly improve a student's learning efficiency because it helps the student focusing on his weakness and prioritizing effort for different topics. This invention presents a computer implemented system and method for selecting practice questions that reflects the focus of actual exam, a student's preferences, and the student's past performance in particular topics.

BRIEF SUMMARY OF THE INVENTION

This invention presents a computerized system and method for selecting practice questions that reflects the focus of actual exam, a student's preferences, and the student's past performance in particular topics. First, the invention collects actual exam information, a student's past performance data and preferences as inputs. These inputs are represented as data tables inside the computer memory. Second, the invention applies a formula to evaluate these inputs to obtain a numeric measure of the importance of each preferred exam practice topic. Next, the invention determines the number of practice questions to select per topic based on the numeric measure. Finally, the invention selects the questions from a set of practice questions, either randomly or deterministically for each topic. An exclusion filter may be applied during the step of selecting questions.

DETAILED DESCRIPTION OF THE INVENTION

Figure 1:
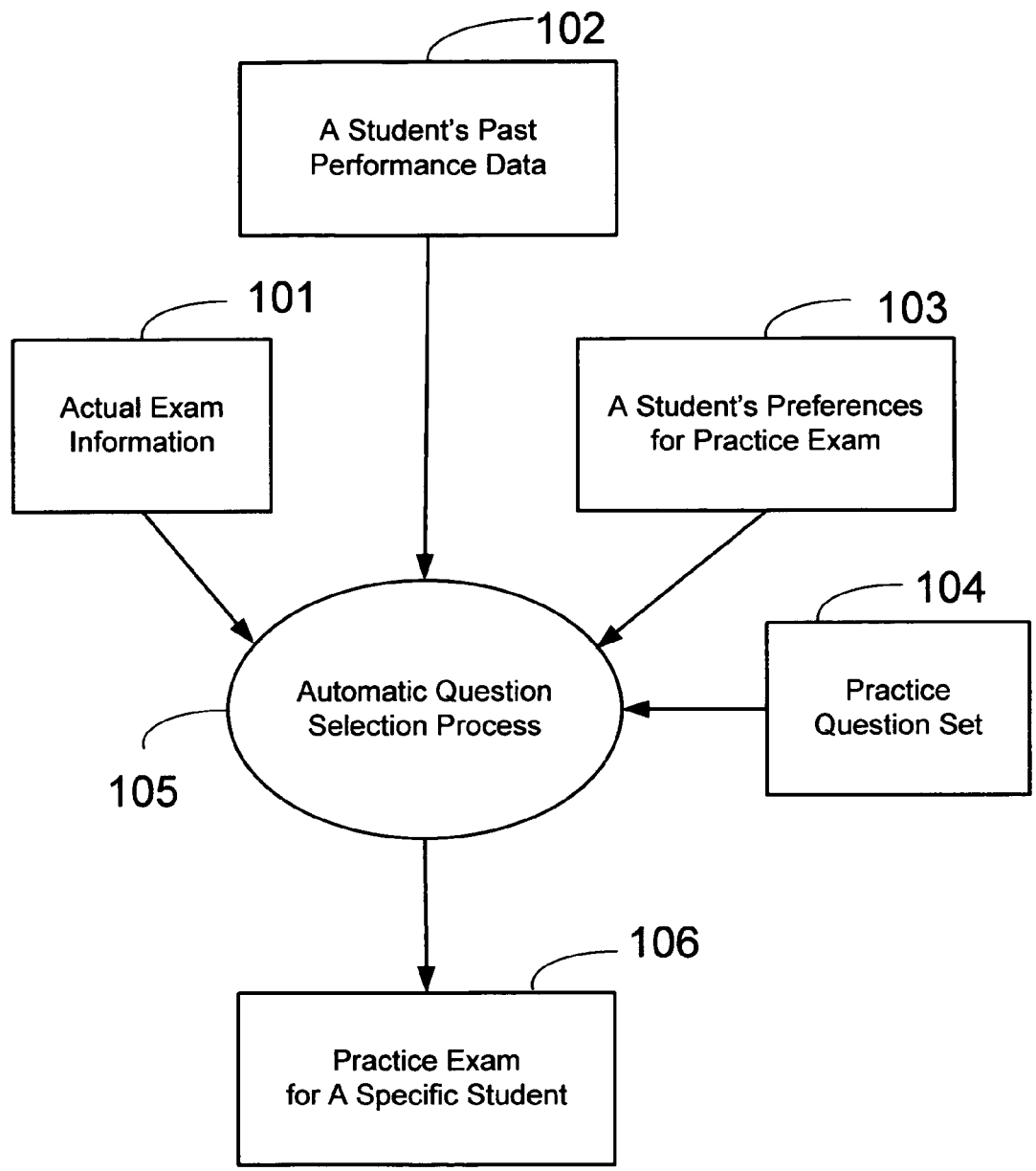
FIG. 1 illustrates the input and output of the invention.

FIG. 1 illustrates the input and output of the invention. In the present invention, the questions of actual and practice exams are categorized into topics. In block 101, the input of actual exam information includes the relative weight of each topic. This weight is expressed as a number. For example, table 1 illustrates the relative weights for 3 topics: T1, T2, and T3. The total of the relative weights may, but not necessarily add up to 100 or any fixed number.

TABLE 1

| Topic | Weight (%) |
|---|---|
| T1 | 10 |
| T2 | 30 |
| T3 | 60 |

In block 102, the input of a student's past performance data include accuracy and efficiency for each topic. Accuracy is expressed as the ratio of correctly answered question over total questions answered by the student in the past. Efficiency is expressed as the average time the student spent on each topic. For example, Table 2 illustrates the accuracy ratio and the average time for each topic T1, T2, and T3.

TABLE 2

| Topic | Accuracy (%) | Average Time Per Question (Seconds) |
|---|---|---|
| T1 | 65 | 110 |
| T2 | 80 | 60 |
| T3 | 55 | 140 |

In block 103, the input of a student's preferences includes the topics and the total number of questions for the desired practice exam. For example, Table 3A illustrates a student's preference for topics T1 and T3. Table 3B illustrates the desired number questions is 50.

TABLE 3A

| Topic | Preferred? |
|---|---|
| T1 | Yes |
| T2 | No |
| T3 | Yes |

TABLE 3B

| Total Number of Question | 50 |
|---|---|

In block 104, the questions of the practice question set are categorized by topics. A question may be associated with a number of topics. Inversely, a topic may be associated with a number of questions. In Relational Database terminology, this relationship is called Many-To-Many relation. For example, Table 4 illustrates question 2 is associated with topics T1 and T3. Question 3 is associated with topic T2.

TABLE 4

| Topic | Question ID |
|-------|-------------|
| T1    | 2           |
| T2    | 3           |
| T3    | 2           |

Figure 2:
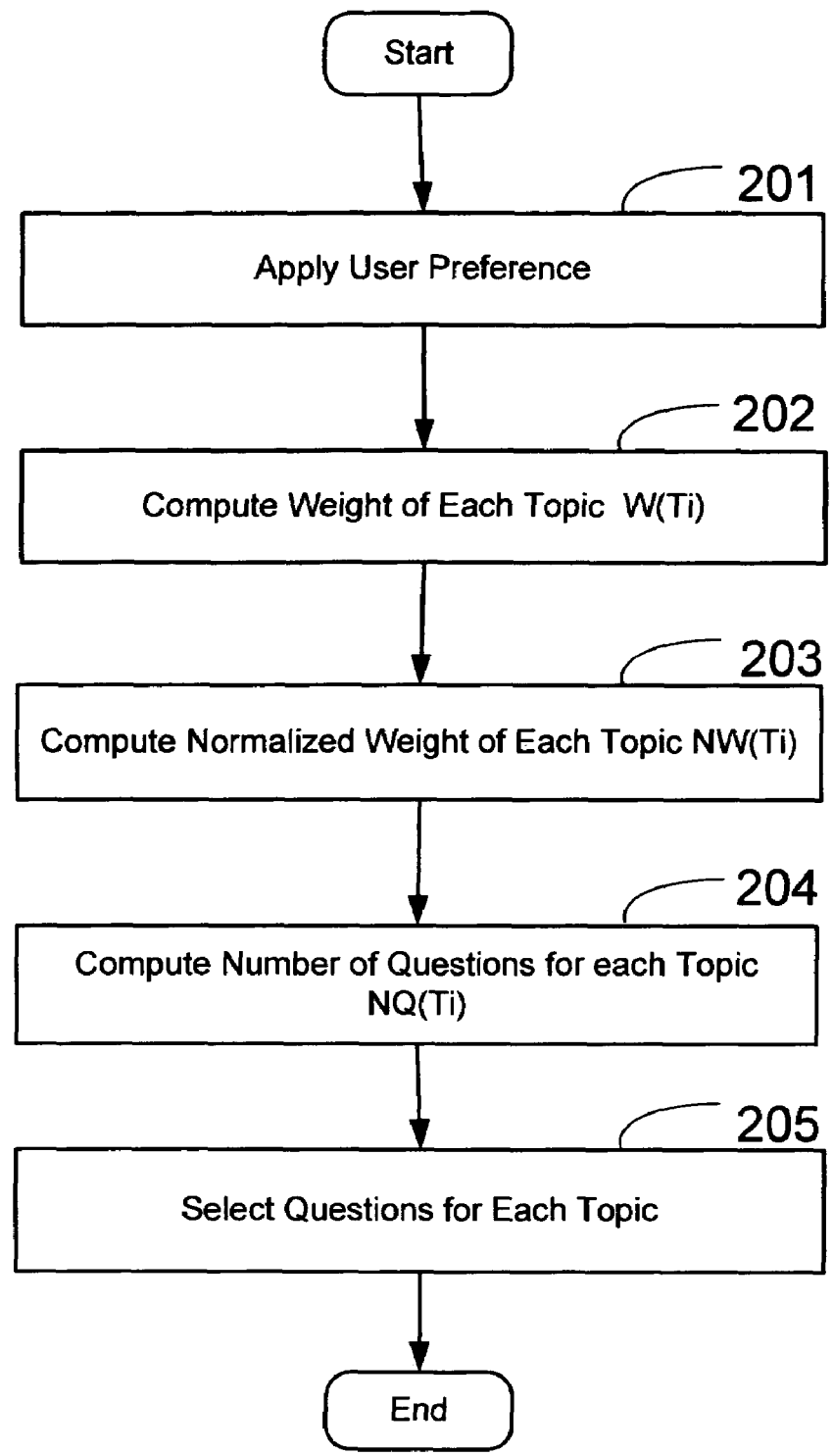
FIG. 2 illustrates the question selection method of the invention.

FIG. 2 illustrates the method used to select the questions of an individualized practice exam for a specific student. The method first determines how many questions for each topic needs to be selected, and then selects the number of questions from practice exam set for each topic.

In block 201, the process applies a student's preferences by selecting topics marked as preferred. This creates a set of topics T={T1 . . . Tn} as represented in Table 3A. In addition, the process obtains the preferred Total Number of Questions (TNQ) as represented in Table 3B.

In block 202, the process computes the weight of each topic Ti in practice exam using the relative weight of a topic in actual exam (101) and a student's past performance data (102). For example:

$$W(Ti)=C1*RW(Ti)+C2*(1-A(Ti))+C3*Time(Ti)$$

where i is an integer from 1 to n, denoting an index into the topic set T.

W(Ti) is the weight of topic Ti in practice exam.

RW(Ti) is the relative weight of topic Ti in actual exam, as represented in Table 1.

A(Ti) is the accuracy of a student's past performance on topic Ti, as represented in Table 2.

Time(Ti) is the average time of a student's past performance on topic Ti, as represented in Table 2.

C1, C2, and C3 are constant numbers used for tuning the process. They may be set arbitrarily or by the student's preferences setting (103).

In block 203, the process computes normalize weight NW(Ti), which indicates the weight of each topic as a percentage of total weight, using the weights W(Ti) obtained in previous block 202. For example, $$NW(Ti)=W(Ti)/\text{sum}(W(Ti) \text{ for } i=1 \ldots n)$$

In block 204, the process computes the number of practice questions for each topic Ti using the normalized weights NT(Ti) and preferred total number of questions TNQ. For example, $$NQ(Ti)=TNQ*NW(Ti)$$

where

NQ(Ti) is the preferred number of practice questions for each topic Ti.

TNQ is the preferred total number of questions, as obtained in block 201.

NW(Ti) is the normalized weights for each topic Ti, as obtained in block 203.

In block 205, the process selects NQ(Ti) questions from the practice question set for each topic Ti. This process may use a random selection method or a deterministic selection method.

For example, a random selection method may take the following steps:

(1) Select a question set Q(Ti) in practice exam set where each question in Q(Ti) is associated with topic Ti, as indicated in Table 4.

(2) Randomly pick x questions from Q(Ti), where x=NQ(Ti).

In contrast, a deterministic selection method may rank questions with levels of difficulty and pick the easier ones first in step 2 above.

Furthermore, an exclusion filter may be applied during the selection step 1 above to exclude questions the student has already answered correctly in the past. For example, a question may be marked with a student's unique identifier during the grading of a practice exam if the student answers it correctly. This marking of questions may be represented by Table 5. During the selection step 1 above, the marked questions are excluded from the question set Q(Ti) if the student's identifier matches that on the question.

TABLE 5

| Question ID | Student ID |
|-------------|------------|
| 1           | 102        |
| 1           | 103        |
| 2           | 103        |

Figure 3:
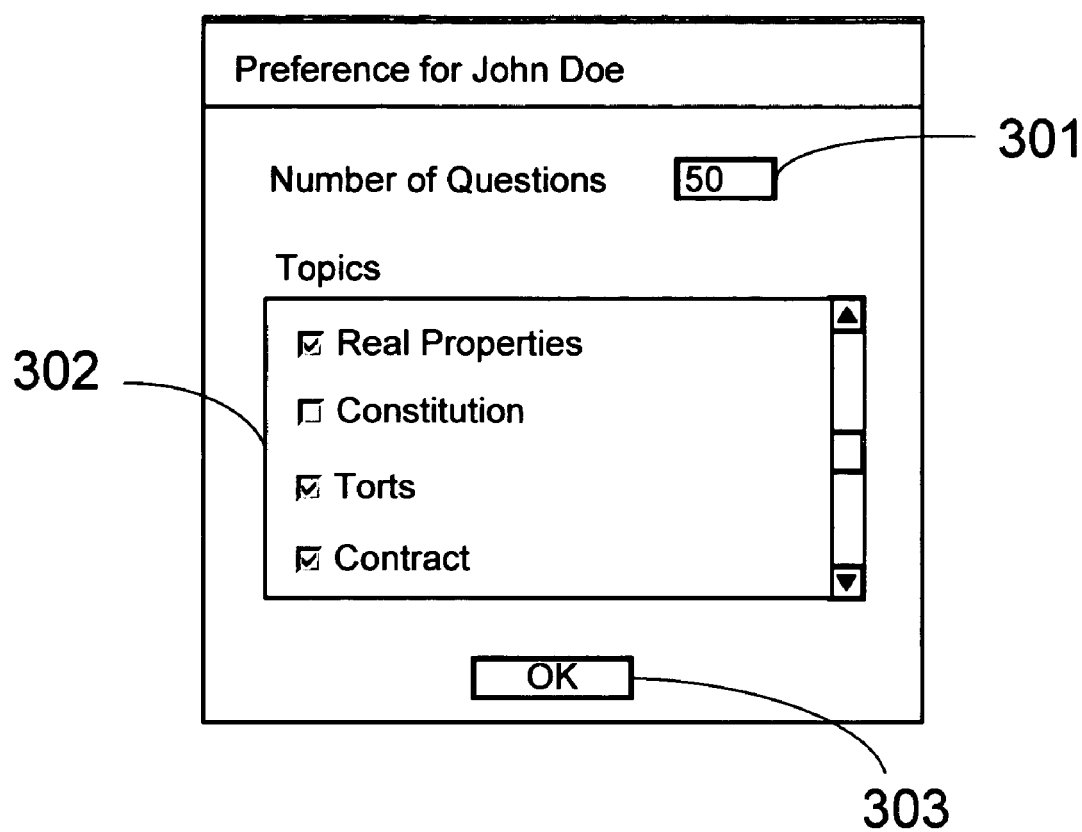
FIG. 3 illustrates a preferred embodiment of user interface that collects user preferences data.

FIG. 3 illustrates a preferred embodiment of user interface that collects a student's preferences. The number of question is displayed in an input text field (301). The list of topics is displayed in a scrollable list panel (302) where selected topic is checked on the left-hand side box. When the OK button (303) is pressed, the selections as displayed are stored as a student's preferences (103).

Figure 4:
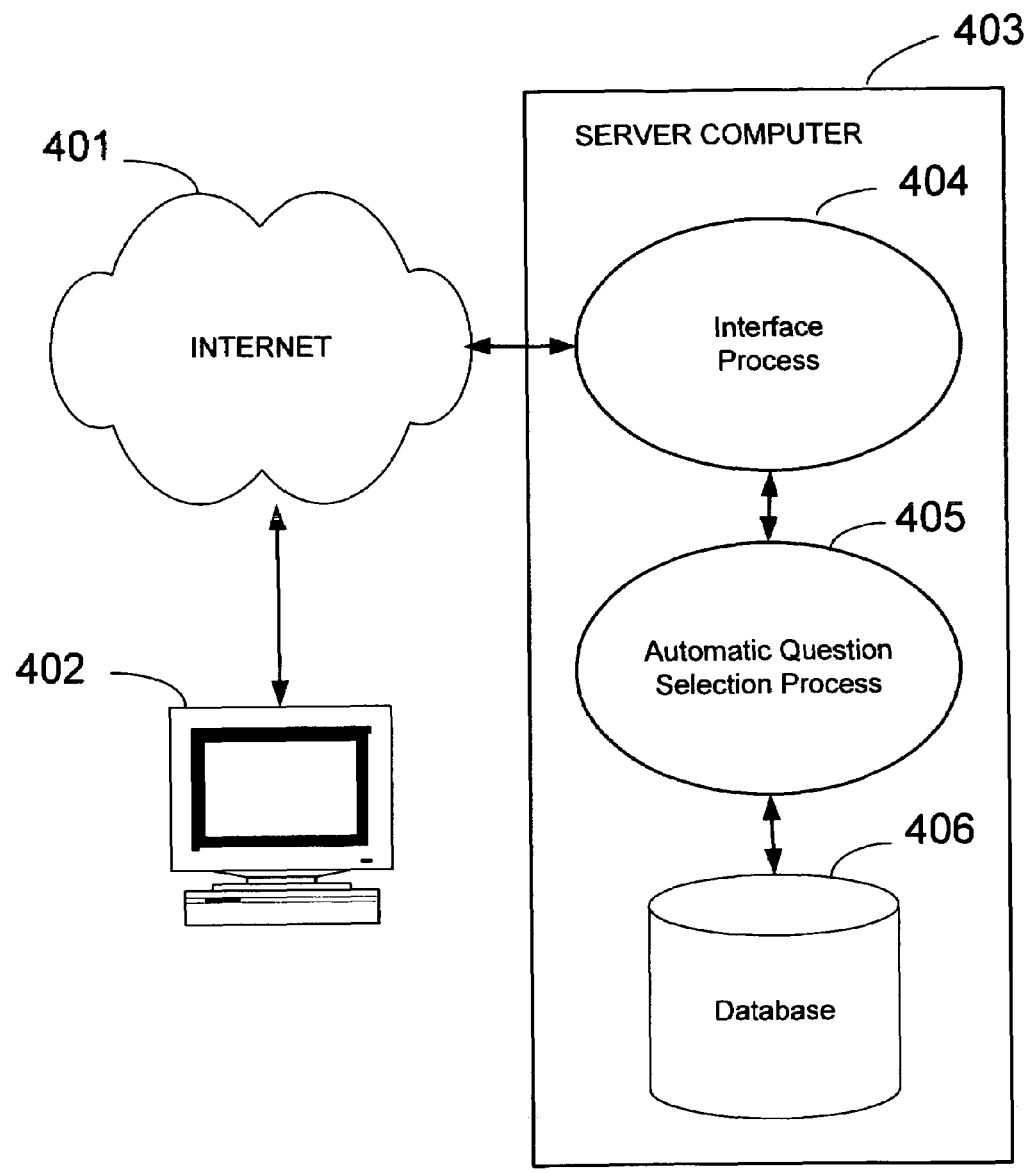
FIG. 4 illustrates a server architecture that may be used to implement a preferred embodiment of the invention.

FIG. 4 illustrates a server architecture that may be used to implement a preferred embodiment of the invention. The server (403) communicates with a student's computer (402) via Internet (401). The interface process (404) handles the communication and display protocols between the server (403) and a student's computer (402). Examples of communication protocols are Internet Protocol (IP) and HTTP (Hyper Text Transfer Protocol). Examples of display protocols are HTML (Hyper Text Markup Language), and X11. The Database (406) stores the input data in blocks 101, 102, 103, and 104. The Automatic Question Selection Process (405) functions as described in block 105.

What I claim as my invention is:

1. A computer-implemented method for creating an individualized exam practice question set, comprising the steps of:

obtaining a student's preferred topics and number of questions, computing weight of each preferred topic by combining the weight of the topic in an actual exam and a student's past performance data on the topic, computing normalized weight of each preferred topic by dividing computed weight over the sum of all computed weights, computing number of questions for each preferred topic by multiplying normalized weight and preferred total number of questions, and selecting questions for each preferred topic randomly or deterministically.

2. The method of claim 1, wherein the step of obtaining user preference further comprises, asking the student for constant numbers used for computing weights.

3. The method of claim 1, wherein a student's past performance data includes an accuracy ratio and an average time spent per question for each topic.

4. The method of claim 1, wherein an exclusion filter is applied during the step of selecting questions.

* * * * *